United States Patent
Choudhary et al.

(10) Patent No.: US 10,291,129 B2
(45) Date of Patent: May 14, 2019

(54) OVERCURRENT RECOVERY IN FLYBUCK CONVERTERS

(71) Applicant: Texas Instruments Incorporated, Dallas, TX (US)

(72) Inventors: Vijay Choudhary, Chandler, AZ (US); Jose Vidal, Jr., Phoenix, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 328 days.

(21) Appl. No.: 14/483,189

(22) Filed: Sep. 11, 2014

(65) Prior Publication Data
US 2016/0079861 A1  Mar. 17, 2016

(51) Int. Cl.
*H02M 3/335* (2006.01)
*H02M 1/32* (2007.01)

(52) U.S. Cl.
CPC ......... *H02M 3/33507* (2013.01); *H02M 1/32* (2013.01)

(58) Field of Classification Search
CPC ......... H02M 3/33507; H02M 3/33523; H02M 3/335; H02M 1/32; H02M 2001/0032
See application file for complete search history.

(56) References Cited

U.S. PATENT DOCUMENTS

| | | | | |
|---|---|---|---|---|
| 5,270,904 | A * | 12/1993 | Gulczynski | H02M 3/1588 363/132 |
| 2003/0038612 | A1 * | 2/2003 | Kutkut | H02M 3/33561 320/140 |
| 2005/0206358 | A1 * | 9/2005 | Van Der Horn | H02M 3/156 323/282 |
| 2007/0041221 | A1 * | 2/2007 | Phadke | H02M 3/33576 363/16 |
| 2012/0104981 | A1 * | 5/2012 | Tseng | H02M 3/158 318/400.3 |

OTHER PUBLICATIONS

AN-2292 "Designing an Isolated Buck (Flybuck) Converter", Application Report, Texas Instruments Incorporated, May 2013, pp. 1-10, U.S.

* cited by examiner

*Primary Examiner* — Nguyen Tran
*Assistant Examiner* — Monica Mata
(74) *Attorney, Agent, or Firm* — Lawrence J. Bassuk; Charles A. Brill; Frank D. Cimino

(57) ABSTRACT

In operation of a flybuck converter, a first output capacitor is charged and, after this charging, charge is transferred from the first output capacitor to a second output capacitor. The charge transferring includes closing a switch to establish a first current path through which the first output capacitor discharges current that induces, in a second current path, current that charges the second output capacitor. While the switch is closed during the charge transfer, a current limit condition in the switch is detected. In response to detection of the current limit condition, the switch is opened, and is thereafter closed again before attempting to charge the first output capacitor again, thereby to resume transferring charge from the first output capacitor to the second output capacitor.

6 Claims, 3 Drawing Sheets

OVERCURRENT RECOVERY IN FLYBUCK CONVERTERS

FIELD

The present work relates generally to flybuck converters (also called isolated buck converters) and, more particularly, to overcurrent recovery in flybuck converters.

BACKGROUND

In many applications, one or more low-cost, simple to use, isolated power supplies working from input voltages up to 100V are needed. Some conventional solutions use an isolated buck converter, also known as a flybuck converter, to generate this bias supply. A flybuck converter uses a conventional synchronous buck converter with coupled inductor windings to create isolated outputs. The coupled inductor windings may be implemented by a relatively small transformer for power transfer. The ratio of the primary and secondary turns (see N1 and N2, respectively, in FIG. 1) is well matched, so the secondary output closely tracks the primary output voltage.

As is known in the art and shown in FIG. 1, a flybuck converter is created by replacing the output filter inductor of a synchronous buck converter with a coupled inductor X1 or flyback-type transformer, and rectifying the secondary winding (N2) voltage using a diode D1 and a capacitor COUT2. The capacitor COUT1 and the switches Q1 and Q2 can be the same as used in a synchronous buck converter. The topology of FIG. 1 can be extended to any number of isolated secondary outputs like VOUT2. It also can be used to generate one or more inverting outputs.

As in all power supply scenarios, overcurrent protection and recovery are important features. It is therefore desirable to provide for effective overcurrent recovery in a flybuck converter such as shown in the example of FIG. 1.

BRIEF DESCRIPTION OF THE DRAWINGS

Figure FIGS. 1 and 2 diagrammatically illustrate a conventional flybuck converter apparatus.

DETAILED DESCRIPTION

Figure 1:
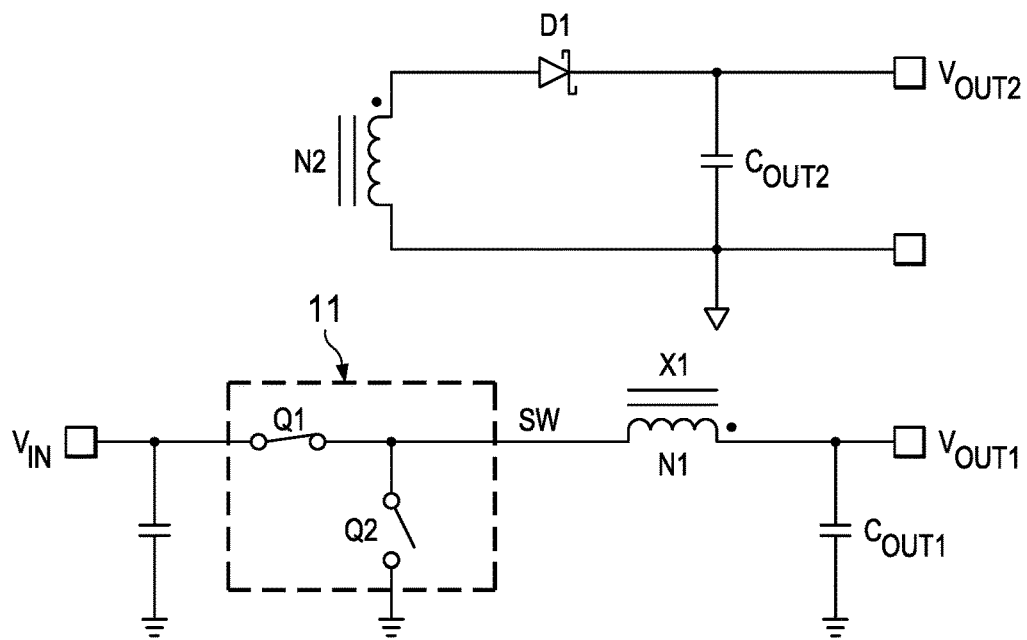

As explained above, a flybuck converter may be built upon the design of a synchronous buck converter. The synchronous buck converter IC (shown diagrammatically at 11 in FIGS. 1 and 2) has a negative (sink) current limit to prevent excessive negative currents from damaging the synchronous switch. The present work recognizes the heretofore-unrecognized problem that the negative current limit, if kept at a level equal to the positive peak current limit, interferes with operation of the flybuck converter under low input voltage (VIN) and high output current conditions, including short circuit. In particular, the negative current limit makes it difficult for a flybuck converter to recover from an overcurrent condition on the (isolated or non-isolated) secondary output (VOUT2 in FIGS. 1 and 2).

Figure 2:
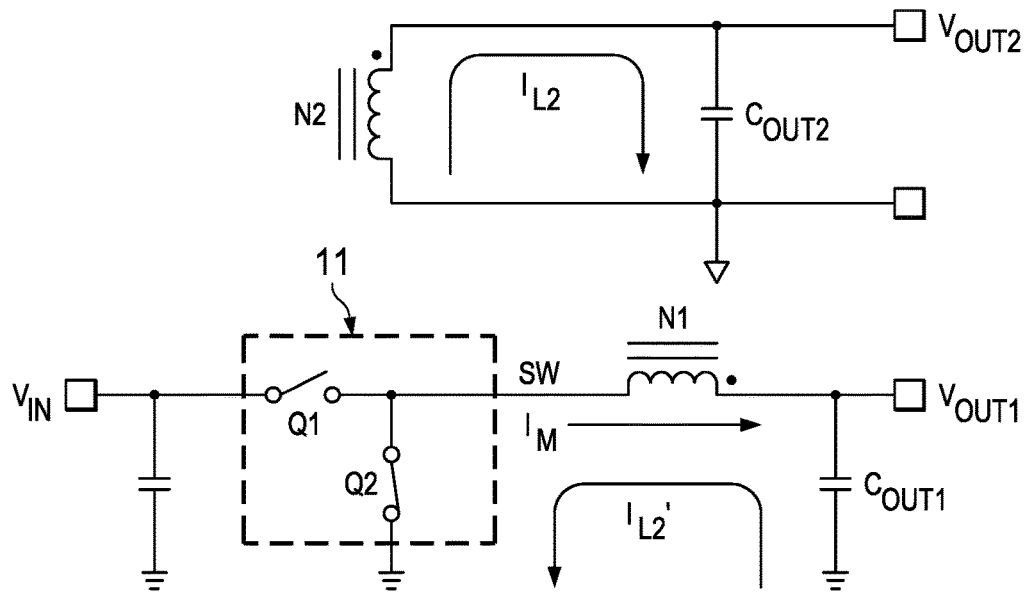
Figure 3:
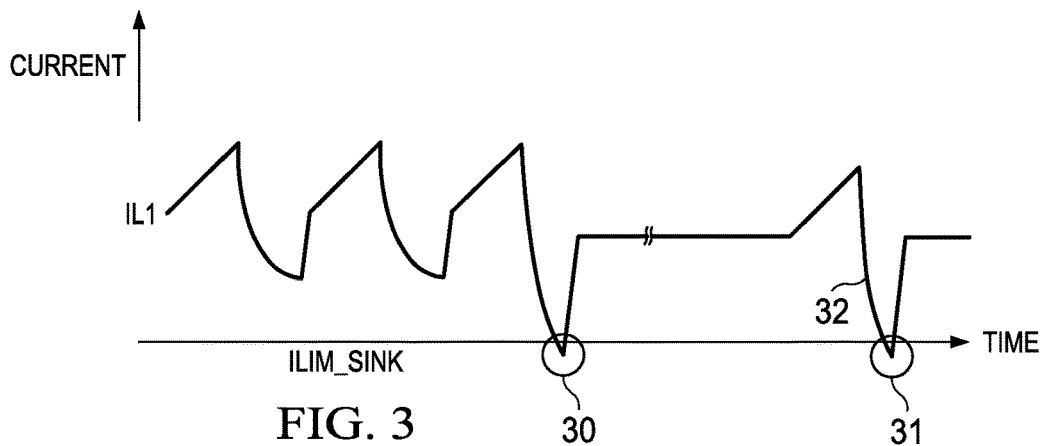
FIG. 3 is a signal diagram that illustrates overcurrent recovery problems that the present work has recognized in the apparatus of FIGS. 1 and 2.

The aforementioned overcurrent condition in a flybuck converter is shown in the signal diagram of FIG. 3, where the primary current IL1 is defined as shown in FIG. 2. The negative current limit is designated ILIM_SINK in FIG. 3, and a negative current limit event (or condition) is designated at 30. In conventional operation, Q2 is opened in response to the event 30. The overcurrent situation is exacerbated when the secondary output VOUT2 falls significantly relative to the primary output VOUT1 (see also FIGS. 1 and 2). The voltage difference VOUT2−VOUT1 appears across the leakage inductance of the coupled inductor (transformer). When that voltage difference is relatively large, it causes the secondary current IL2 (see FIG. 2) to spike when the converter attempts, after event 30, to resume normal operation by closing and opening Q1 and closing Q2. This spike in the secondary current IL2 causes a corresponding negative spike 32 in the primary current IL1 (see also FIG. 2), which trips the negative current limit again at 31. When the primary output VOUT1 is not loaded, a repetition of this phenomenon will result in VOUT2 not recovering from short circuit into a heavy load condition. In other words, there will be significant current limit fold-back at the secondary output (VOUT2) when recovering from an overload or short circuit condition.

Every time the converter tries to switch, the positive inductor current pulse (IM component of IL1) charges the primary output capacitor COUT1. If this is not offset while IL1 is negative and before hitting ILIM_SINK (see FIG. 3), the primary output VOUT1 will not fall below the reference point and therefore will not trip the feedback comparator (not shown in FIG. 2) until the leakage load on the primary output VOUT1 discharges the primary output capacitor COUT1. With lower leakage inductances, the sink current limit will be reached sooner, and it is therefore possible for the converter to become stuck in this condition.

Figure 4:
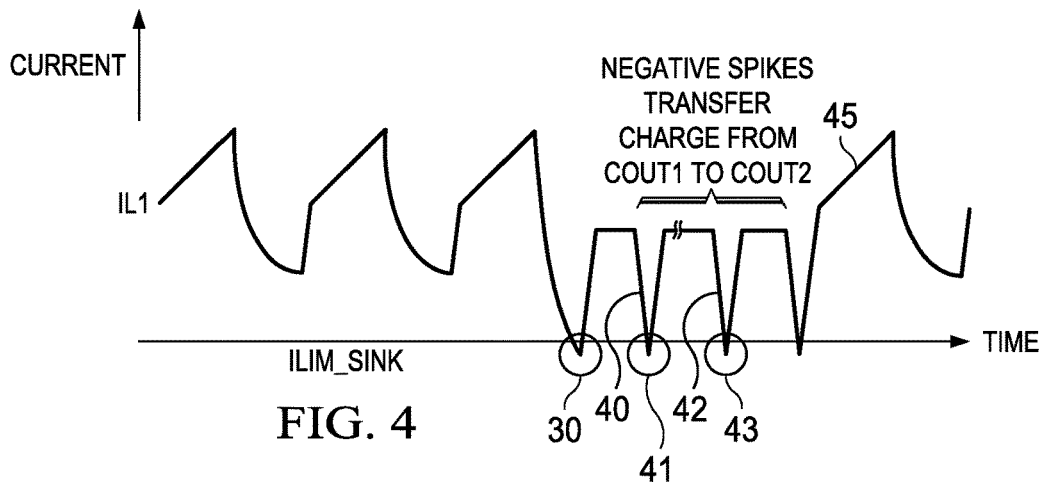
FIG. 4 is a signal diagram that illustrates operations according to example embodiments of the present work that can mitigate problems such as shown in FIG. 3.

FIG. 4 is a timing diagram that illustrates operations that can mitigate the above-described problems according to example embodiments of the present work. When the negative current returns to a safe level (ideally zero) after event 30, Q2 is closed again, which produces another negative current spike 40 that triggers another negative current limit event 41. After event 41, Q2 is closed again when the negative current returns to a safe level, producing another negative spike 42 that triggers another negative current limit event 43. Negative current on the primary side transfers charge from COUT1 to COUT2, so each of the negative current spikes 40, 42, etc. in IL1 transfers charge from COUT1 to COUT2. This charge transfer reduces VOUT1 and thus advantageously reduces the aforementioned problematic voltage difference VOUT2−VOUT1. When VOUT1 eventually decreases enough to trip the feedback comparator, normal operation resumes as shown at 45.

Upon occurrence of a negative current limit event and the associated opening of Q2, various embodiments use various techniques to determine when the negative current has returned to a safe level so that Q2 may be closed again safely. For example, some embodiments compare the voltage at node SW to the input voltage VIN (see also FIGS. 1 and 2). When the voltage at SW falls below VIN, this is an indication that the negative current has returned to a safe level (ideally zero). Some embodiments sense current in Q1 (see also FIG. 1) or in a sense resistor provided in series with Q1 to determine if the current has fallen to a safe level.

Some embodiments implement a delay time to allow the negative current to return to a safe level. The delay time begins at the occurrence of a negative current limit event. When the delay time has elapsed, Q2 is closed again. In some embodiments, the delay time is about five microseconds.

Some embodiments use a failsafe mechanism wherein some minimal delay time is implemented, but the final decision regarding when to close Q2 again is further conditioned on the voltage at node SW falling below VIN. This avoids closing Q2 when desired current reduction is still occurring. In various embodiments, the aforementioned minimal delay time has various values in a range between about one microsecond and about two microseconds.

Figure 8:
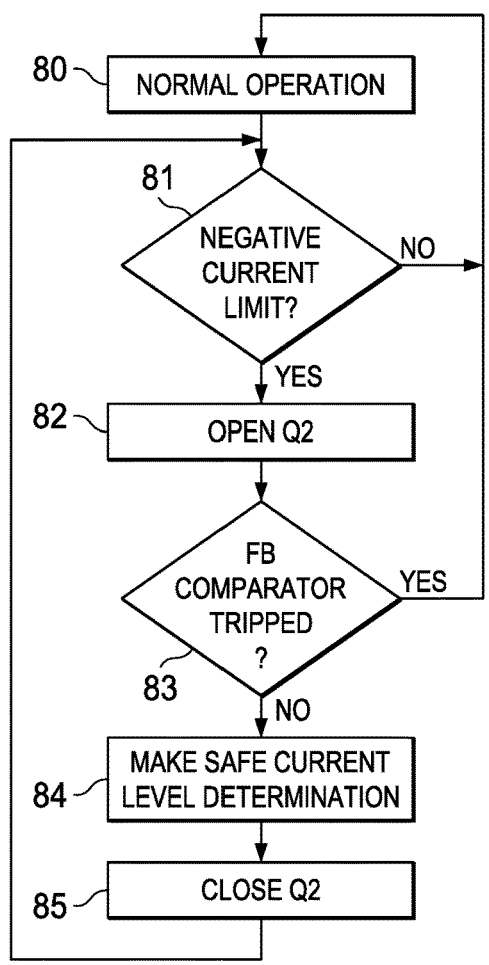
FIG. 8 illustrates operations that may be performed according to example embodiments of the present work.

FIG. 8 provides an illustration of operations described above according to example embodiments of the present work. During normal flybuck converter operation 80, a negative current limit condition is detected or not detected at 81. If the condition is not detected, then normal converter operation continues at 80. If a negative current limit condition is detected at 81, then Q2 is opened at 82, after which it is determined at 83 whether the feedback (FB) comparator has been tripped. If so, then normal converter operation may be resumed at 80. Otherwise, after deciding that the negative current has returned to a safe level at 84 (e.g., by monitoring the SW voltage versus VIN, by implementing a delay, or both), Q2 is closed at 85. Thereafter, a negative current limit is (again) detected or not detected at 81, and the above-described operation flow repeats.

Figure 5:
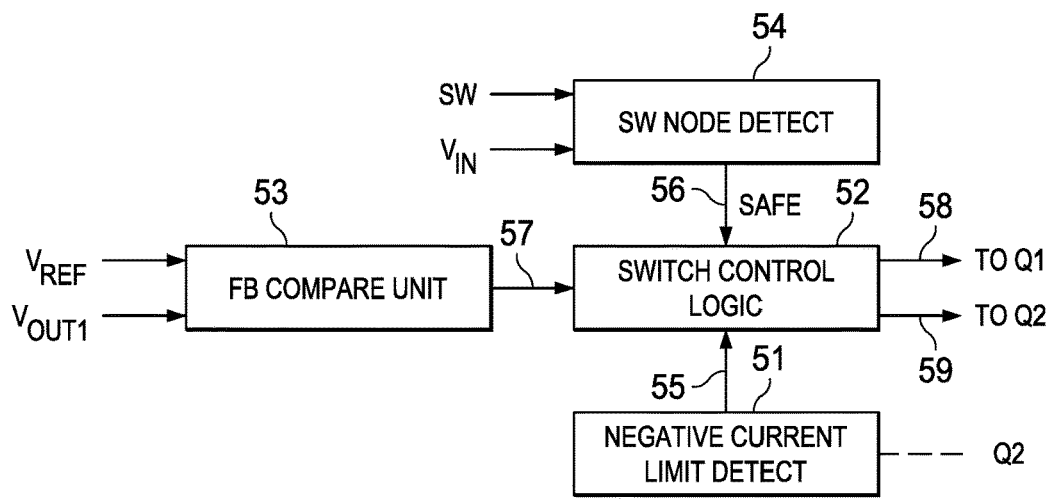
FIGS. 5-7 diagrammatically illustrate flybuck converter apparatus according to example embodiments of the present work.

FIG. 5 diagrammatically illustrates control for a flybuck converter apparatus according to example embodiments of the present work. In some embodiments, the apparatus shown in FIG. 5 is capable of implementing the operations described above relative to FIG. 8. Switch control logic 52 provides control signals 58 and 59 that drive respective control inputs of Q1 and Q2 to selectively open/close Q1 and Q2. A SW node detector 54 detects when the SW node voltage falls below VIN and provides at 56 an indication of this as a SAFE input to logic 52. The negative current limit detector 51 provides to the logic 52 an indication 55 of overcurrent in Q2. The feedback comparator unit 53 provides to the logic 52 an indication 57 that VOUT1 has fallen below the reference point VREF. Both the negative current limit detector 51 and the feedback comparator unit 53 are conventionally used in flybuck converters. Although the output capacitors and coupled inductors are not shown in FIG. 5, in some embodiments they conform to the conventional arrangements shown in FIGS. 1 and 2.

Figure 6:
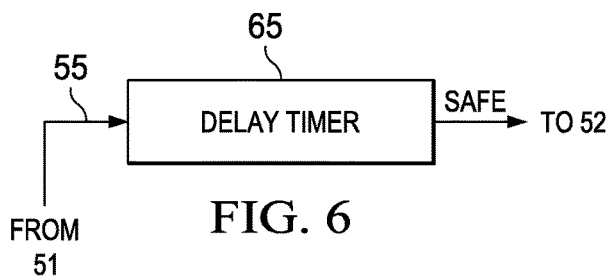

FIG. 6 diagrammatically illustrates control for a flybuck converter apparatus according to example embodiments of the present work. The apparatus of FIG. 6 is generally similar to that of FIG. 5, but the SW mode detector 54 of FIG. 5 is replaced in FIG. 6 by a delay timer 65. The delay timer 65 is coupled to receive the overcurrent indication 55 provided by the negative current limit detector 51 (see also FIG. 5). The delay timer 65 implements the aforementioned delay time (e.g., around five microseconds in some embodiments) and provides the SAFE input to logic 52 (see also FIG. 5). In some embodiments, the apparatus depicted in FIG. 6 otherwise conforms to that of FIG. 5.

Figure 7:
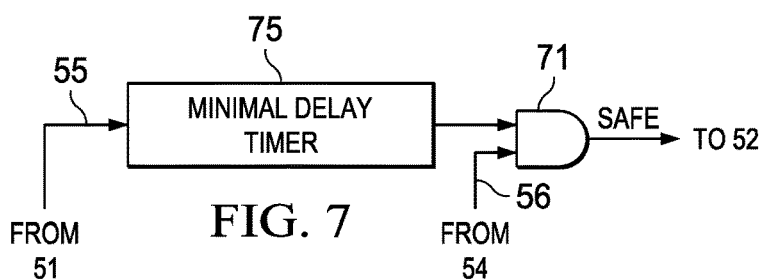

FIG. 7 diagrammatically illustrates control for a flybuck converter apparatus according to example embodiments of the present work. The apparatus of FIG. 7 is generally similar to that of FIG. 5, except a minimal delay timer 75 is used together with the SW node detector 54 of FIG. 5. The minimal delay timer 75 is coupled to receive the overcurrent indication 55 from the negative current limit detector 51 (see also FIG. 5). The timer 75 implements the minimal delay time described above. Combining logic 71 (e.g., AND gate in some embodiments) uses the output 56 of the SW node detector 54 to qualify the output of timer 75. The output of the combining logic 71 provides the SAFE input to logic 52 (see also FIG. 5). In some embodiments, the apparatus depicted in FIG. 7 otherwise conforms to that of FIG. 5.

Although example embodiments of the present work have been described above in detail, this does not limit the scope of the work, which can be practiced in a variety of embodiments.

What is claimed is:

1. A process of operating a flybuck converter having a flyback transformer with a primary and secondary winding, a voltage input, a first switch connected between the voltage input and a first terminal of the primary winding, a first voltage output connected to a second terminal of the primary winding, a first capacitor connected between the first voltage output and circuit ground, a second switch connected between the first terminal of the primary winding and circuit ground, a second capacitor connected between the terminals of the secondary winding, a rectifier diode connected between one terminal of the secondary winding and the second capacitor, and a second voltage output connected to the connection of the rectifier diode and the second capacitor, comprising:
   (a) charging the first output capacitor through the first winding of the transformer by closing the first switch and opening the second switch;
   (b) after the charging, transferring charge from the first output capacitor to the second output capacitor through the second winding of the transformer, including opening the first switch and closing the second switch to establish a first current path through the transformer in which the first output capacitor discharges current that induces, in a second current path that includes the second winding, current that charges the second output capacitor;
   (c) while the second switch is closed during the transferring, detecting a current limit condition in the second switch; and
   (d) in response to the detecting, again opening the second switch, and thereafter yet again closing the second switch before attempting to charge the first capacitor again by closing the first switch and opening the second switch, to resume transferring charge from the first output capacitor to the second output capacitor.

2. The process of claim 1 in which detecting a current limit condition in the second switch includes detecting a negative current in the second switch.

3. The process of claim 1 in which the again opening the second switch includes again opening the second switch after a time delay.

4. The process of claim 1 in which the again opening the second switch includes again opening the second switch after a time delay gated by a voltage from the first winding.

5. A flybuck converter comprising:
   (a) a flyback transformer with a primary and secondary winding;
   (b) a voltage input;
   (c) a first switch connected between the voltage input and a first terminal of the primary winding and having a first control input;
   (d) a first voltage output connected to a second terminal of the primary winding;
   (e) a first capacitor connected between the first voltage output and circuit ground;

(f) a second switch connected between the first terminal of the primary winding and circuit ground and having a second control input;
(g) a second capacitor coupled between the terminals of the secondary winding;
(h) a rectifier diode connected between one terminal of the secondary winding and the second capacitor;
(i) a second voltage output connected to the connection of the rectifier diode and the second capacitor;
(j) switch control logic having:
  (1) a first control output connected to the first control input;
  (2) a second control output connected to the second control input;
  (3) having a safe input;
  (4) an over current input; and
  (5) a compare input;
(k) node detect logic having an input coupled to the first terminal of the primary winding, an input coupled to the voltage input, and a safe output connected to the safe input;
(l) compare logic having an input coupled to the first output voltage, an input connected to a reference voltage, and a compare output connected to the compare input; and
(m) negative current limit detect logic having an input coupled to the second switch and an over current output connected to the over current input.

6. The converter of claim 5 including a timer having an input connected to the over current output and a safe output connected to the safe input.

* * * * *